(12) United States Patent
Rogers

(10) Patent No.: US 11,096,377 B1
(45) Date of Patent: Aug. 24, 2021

(54) ADJUSTABLE PET WASTE SCOOP

(71) Applicant: Robert Rogers, Bluffs, IL (US)

(72) Inventor: Robert Rogers, Bluffs, IL (US)

(*) Notice: Subject to any disclaimer, the term of this patent is extended or adjusted under 35 U.S.C. 154(b) by 0 days.

(21) Appl. No.: 16/990,044

(22) Filed: Aug. 11, 2020

(51) Int. Cl.
A47F 13/06 (2006.01)
A01K 29/00 (2006.01)
A01K 23/00 (2006.01)
E01H 1/00 (2006.01)
B25G 1/04 (2006.01)

(52) U.S. Cl.
CPC .............. A01K 23/005 (2013.01); B25G 1/04 (2013.01); E01H 1/006 (2013.01)

(58) Field of Classification Search
CPC ......... A01K 23/005; B25G 1/04; E01H 1/006
USPC .................. 294/1.4, 1.5; 15/257.3, 257.8
See application file for complete search history.

(56) References Cited

U.S. PATENT DOCUMENTS

| 3,804,448 | A | * | 4/1974 | Schmieler | E01H 1/1206 294/1.4 |
| 3,879,079 | A | * | 4/1975 | Nicholas | E01H 1/1206 294/1.4 |
| 4,447,082 | A | * | 5/1984 | Lindholm | E01H 1/1206 294/1.4 |
| D298,369 | S | * | 11/1988 | Shun | 294/1.4 |
| 4,911,039 | A | * | 3/1990 | Lubbock | B25B 13/48 16/429 |
| 5,320,393 | A | * | 6/1994 | Cortinas | E01H 1/1206 15/257.6 |
| 5,820,179 | A | * | 10/1998 | Tsou | E01H 1/1206 294/1.4 |
| 5,899,510 | A | * | 5/1999 | Hayes | E01H 1/1206 294/1.4 |
| 6,135,520 | A | * | 10/2000 | Miller | E01H 1/1206 294/1.4 |
| D461,027 | S | * | 7/2002 | Gardner | D30/162 |
| 6,478,351 | B1 | * | 11/2002 | Nelson | E01H 1/1206 15/257.2 |
| 7,188,878 | B1 | * | 3/2007 | Kraus | E01H 1/1206 248/101 |
| 7,631,910 | B2 | | 12/2009 | Shalhoub | |
| 8,511,728 | B2 | | 8/2013 | Beaton | |
| 8,955,893 | B1 | | 2/2015 | Stern et al. | |
| 9,131,661 | B2 | | 9/2015 | Spandau | |
| 9,609,849 | B1 | | 4/2017 | Hyman | |
| D828,652 | S | * | 9/2018 | Ausere | D30/162 |
| 10,633,810 | B2 | * | 4/2020 | Pavloski | E01H 1/1206 |
| 2004/0164568 | A1 | | 8/2004 | Diehl | |

(Continued)

*Primary Examiner* — Paul T Chin
(74) *Attorney, Agent, or Firm* — Boudwin Intellectual Property; Daniel Boudwin

(57) ABSTRACT

An adjustable pet waste scoop includes a handle shaft and a scoop shaft connected in a telescopic configuration, such that the overall length of the device is adjustable. A scoop is connected to a lower end of the scoop shaft. The scoop includes an open-ended front portion extending in a first direction perpendicular to the scoop shaft and an open-ended rear portion extending in an opposing second direction at an upward angle with respect to the front portion. The scoop may include one or more clips for securing a pet waste bag to the scoop and may further include annular grooves that receive clamps or other fasteners for further securing the pet waste bag. The open-ended configuration and fasteners allow a pet waste bag to be attached to the scoop in multiple configurations according to user preference.

13 Claims, 3 Drawing Sheets

(56) References Cited

U.S. PATENT DOCUMENTS

| | | | | |
|---|---|---|---|---|
| 2009/0050065 A1* | 2/2009 | Evans | ................... | E01H 1/1206 119/161 |
| 2009/0134644 A1* | 5/2009 | Roberts | ................ | E01H 1/1206 294/1.4 |
| 2014/0327256 A1* | 11/2014 | Zurn | .................... | E01H 1/1206 294/1.4 |

* cited by examiner

ADJUSTABLE PET WASTE SCOOP

BACKGROUND OF THE INVENTION

The present invention relates to pet waste scoops. More specifically, the present invention provides an adjustable pet waste scoop that can support a pet waste bag in different configurations. Many individuals enjoy having a dog or other pet. Pet owners have the responsibility of disposing of any waste left behind by a pet. For example, dog owners often walk their dog in public spaces and may be legally required to pick up solid waste the dog leaves behind. It can be an unpleasant experience to remove pet waste from a surface. Pet owners must also clean up pet waste from their own yards and property. However, some pet owners forgo this important responsibility due to its unpleasant nature.

One solution is to utilize a plastic bag to pick up waste, whereby the plastic bag is inverted and placed over the user's hand and then folded around the pet waste after the user picks up the pet waste. This method of retrieving pet waste requires the user to bend over pick up the pet waste with their hands, which can be uncomfortable and difficult for individuals with limited mobility. While the plastic bag provides a barrier between the pet waste and the user's hand, the plastic bag is thin and necessarily conforms to the shape of the pet waste. This causes users to feel a sensation of contact between the user's hands and the pet waste despite the presence of a plastic film barrier therebetween. The feeling of the pet waste in one's hand can be unpleasant and can further deter individuals from picking up after their pet. In order to address the above concerns, it is desirable to provide a pet waste scoop that can be utilized to gather pet waste into a disposable bag without the need to physical handle the bag and the waste.

Devices have been disclosed in the known art that relate to waste handling tools for removing pet waste. However, the devices in the known art have many drawbacks. For example, some devices exist that include scoops for handling pet waste, but do not include a mechanism for securing a disposable bag to the scoop. Other scoop devices that include attached bags typically include many moving parts that are susceptible to breakage or malfunction. Additionally, such devices only provide a single way to secure a bag to the scoop or grasper, which often is ineffective. These devices fail to provide adjustment capabilities or customization options for the user.

In light of the devices disclosed in the known art, it is submitted that the present invention substantially diverges in design elements from the known art and consequently it is clear that there is a need in the art for an improvement to pet waste scoops. In this regard the instant invention substantially fulfills these needs.

SUMMARY OF THE INVENTION

In view of the foregoing disadvantages inherent in the known art, it is submitted that the present invention substantially diverges in design elements from the known art and consequently it is clear that there is a need in the art for an improvement to existing pet waste scoops, particularly with regard to their ability to secure a pet waste bag in multiple positions and configurations. In this regard, the present invention substantially fulfills these needs.

In one embodiment, the adjustable pet waste scoop includes a handle shaft and a scoop shaft connected to a lower end of the handle shaft in a telescopic configuration. A scoop is connected to a lower end of the scoop shaft. The scoop defines a channel having an open-ended front portion extending in a first direction perpendicular to the scoop shaft and a rear portion extending in an opposing second direction at an upward angle with respect to the front portion. In operation, a pet waste bag can be secured to scoop in multiple configurations via one or more fasteners. For example, the waste bag can be secured such that its outer walls are positioned within the channel defined by the scoop. The waste bag can also be secured around the outside of the scoop, such that rear end of the scoop extends through the opening of the bag. In this way, the user can customize the operation of the scoop according to their preference.

It is therefore an object of the present invention to provide a new and improved pet waste scoop device that has all of the advantages of the devices in the known art and none of the disadvantages.

Another object of the present invention is to provide a pet waste scoop with multiple fasteners on the scoop for securing the pet waste bag in different configurations.

A further object of the present invention is to provide an adjustable pet waste scoop that includes a handle grip and an angled lower portion that increase the comfort and ease of use for the user.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
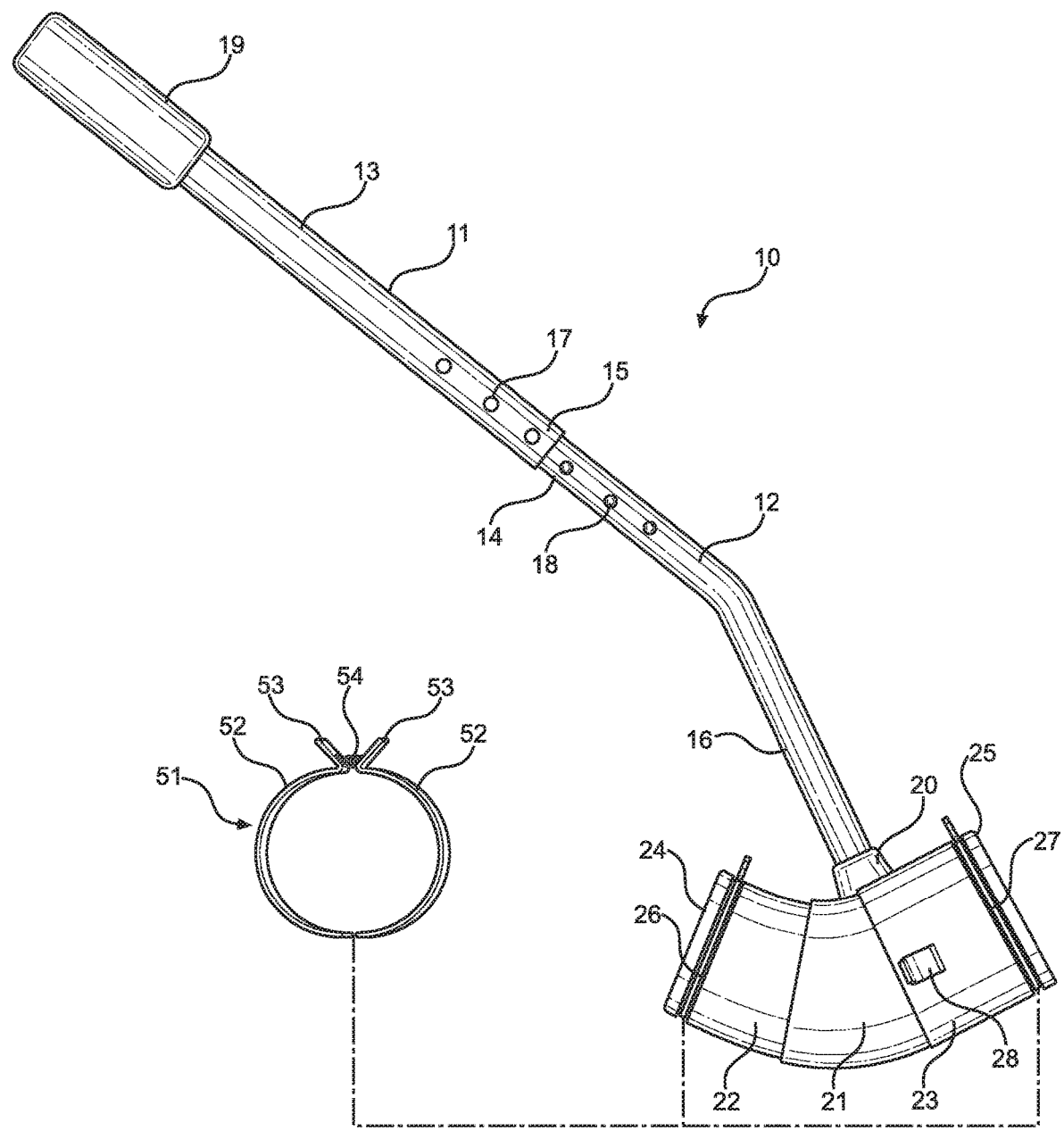
FIG. 1 shows a side elevation view of an embodiment of the adjustable pet waste scoop.

Reference is made herein to the attached drawings. Like reference numerals are used throughout the drawings to depict like or similar elements of the adjustable pet waste scoop. The figures are intended for representative purposes only and should not be considered to be limiting in any respect.

Referring now to FIG. 1, there is shown a side elevation view of an embodiment of the adjustable pet waste scoop. The adjustable pet waste scoop 10 generally includes an upper handle shaft 11 connected to a lower scoop shaft 12. The handle shaft 11 includes a grip 19 on the upper end 13 in order to provide a comfortable gripping and handling surface for the user. The handle shaft 11 and scoop shaft 12 maintain a telescopic arrangement, such that the overall length of the pet waste scoop 10 can be adjusted by the user. In the shown embodiment, the telescoping arrangement includes an upper end 14 of the scoop shaft 12 inserted into a lower end 15 of the handle shaft 11. However, other embodiments may include alternate adjustment arrangements. A ball detent system is utilized in the illustrated embodiment to maintain a desired length, with spring-loaded balls 18 disposed on the scoop shaft 12 and corresponding detents 17 on the handle shaft. In other embodiments, the ball and detents can be positioned on opposite shafts, or other mechanisms may also be utilized.

A scoop 21 is connected to a lower end 16 of the scoop shaft 12. In the shown embodiment, the lower end 16 of the scoop shaft 12 is inserted into a connector 20 on the scoop 21; however, other connection mechanisms for securing the scoop 21 the scoop shaft 12 may be utilized. The scoop 21 includes an open ended front portion 25 extending in a first direction perpendicular to the lower end 16 of the scoop shaft 12 and an open-ended rear portion 22 extending in an opposing second direction at an upward angle with respect to the front portion 23. Additionally, in the shown embodiment, the handle shaft 11 is straight or linear while the lower end of 16 of the scoop shaft 12 includes an angled bend, such that maintain the lower end of 16 at vertical causes the handle shaft 11 to extend rearwardly at an angle, as most clearly visible in FIG. 3. This rearward angle combined with the angles of the front and rear portions 23, 22 of the scoop 21 provide a more ergonomic device that is easier and more comfortable to use.

In order to secure a waste bag to the scoop 21, the scoop can include multiple fasteners. For example, in the shown embodiment, the scoop 21 includes a resilient clip 28 that is configured to secure a bag between itself and the outer walls of the scoop 21. The number and positioning of clips 28 can vary to provide multiple effective attachment points. The scoop 21 further includes a front groove 27 extending annularly around its front portion 23 and a similar rear groove 26 extending annularly around the rear portion 22. The grooves 27, 26 are sized to receive a clamp 51 which acts as an additional fastener to secure the waste bag to the scoop 21. In the shown embodiment, the clamp 51 includes a pair of jaws 52 each having a handle tab 53 for opening the clamp 51, and a spring 54 connection the jaws 52 that biases the clamp 51 to a closed position. In operation, a pet waste bag can be secured between the clamp jaws 52 and either front or rear groove 25, 26.

Figure 2:
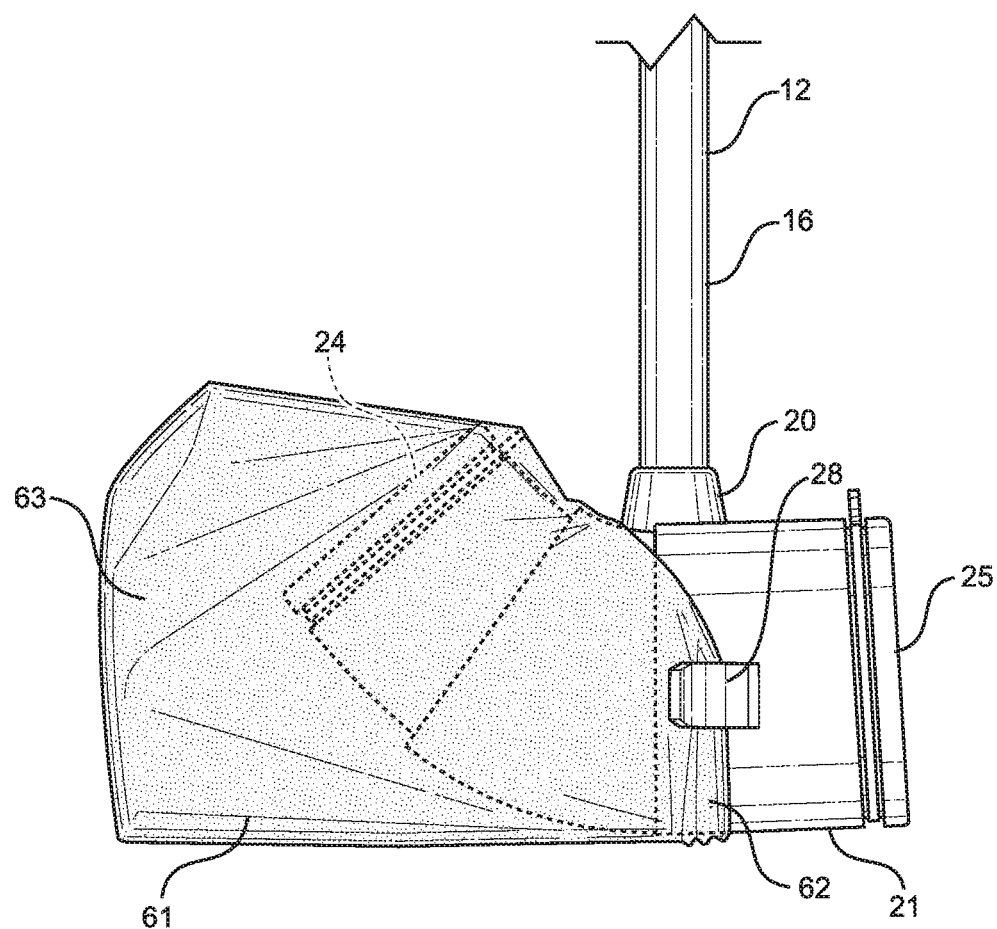
FIG. 2 shows a side elevation view of an embodiment of the adjustable pet waste scoop with a pet waste bag secured in a first configuration.

Referring now to FIG. 2, there is shown a side elevation view of an embodiment of the adjustable pet waste scoop with a pet waste bag secured in a first configuration. In the illustrated embodiment, the lower end 16 of the handle shaft 12 and the connector 20 are oriented at vertical as they typically would be when scooping pet waste off a generally horizontal ground surface through the front opening 25 of the scoop 21. In this embodiment, the resilient clip 28 includes a connected end toward the front end of the scoop 21 and a movable end toward the rear end of the scoop 21, such that the open upper edge of 62 of a waste bag 61 can be secured to the scoop 21 via the resilient clip. In this configuration, the open rear end 24 of the scoop 21 extends into the volume of the bag 61, whereby the closed end 63 of the bag 61 retains pet waste as it exits the rear end of the scoop 21. While not shown in this figure, the clamps or other fasteners can be utilized to further secure the waste bag in this manner.

Figure 3:
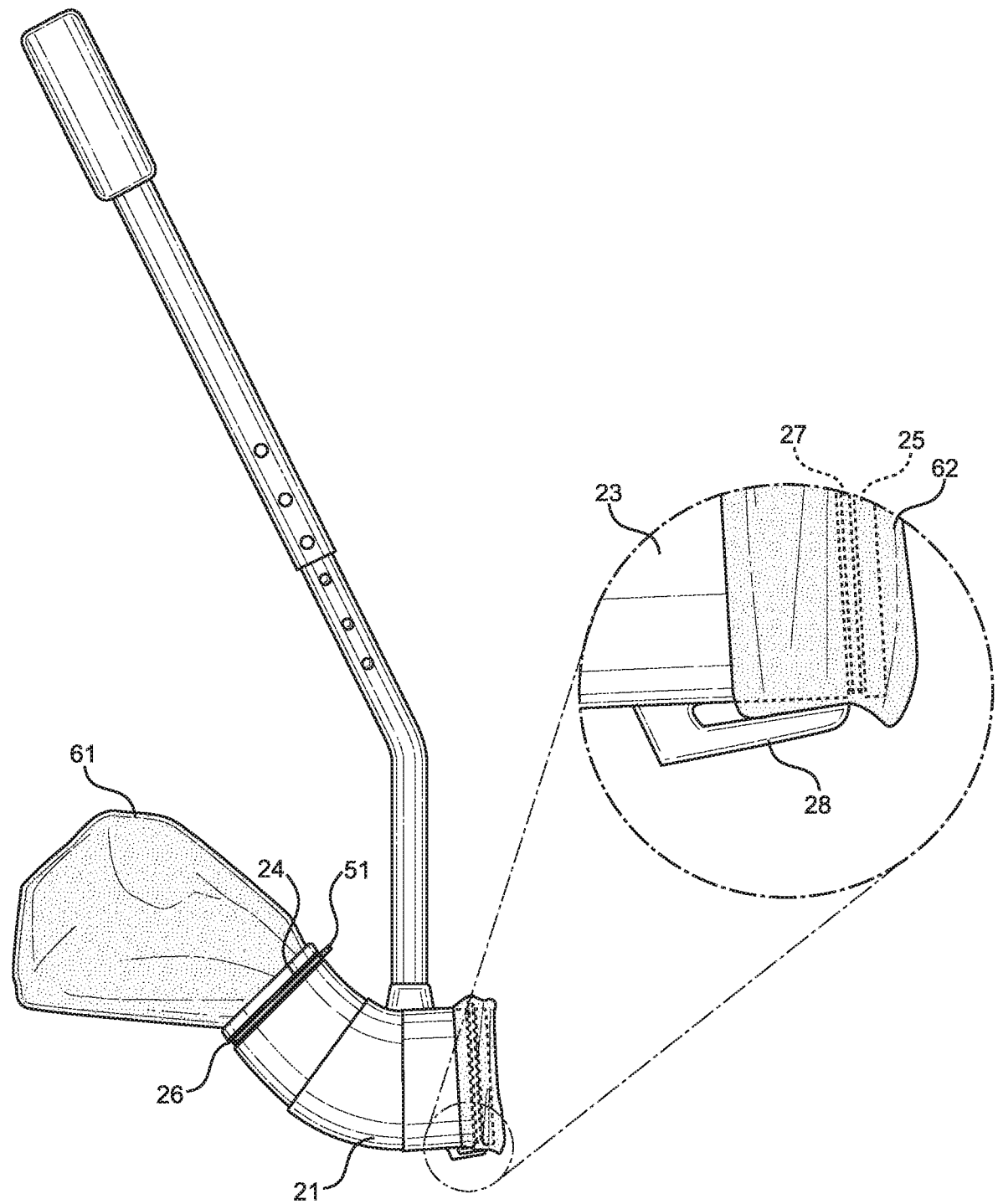
FIG. 3 shows a side elevation view of an embodiment of the adjustable pet waste scoop with a pet waste bag secured in a second configuration.

Referring now to FIG. 3, there is shown a side elevation view of an embodiment of the adjustable pet waste scoop with a pet waste bag secured in a second configuration. In this configuration, the resilient clip 28 is oriented such that it includes a connected portion toward the rear end of the scoop 21 and a liftable tab portion toward the front end 23 of the scoop 21. In this configuration, the waste bag 61 is inserted through the scoop 21 such that it extends out through the open rear end 24, whereby the front opening 62 of the waste bag is secured via the clip 28. The waste bag opening overlaps the front opening 25 of the front end 23 of the scoop 21. The clamps 51 and groove 26, 27 system may be utilized for further securing the bag in place if needed. When the bag needs to be removed, the user can simply detach the front end of the bag 61 from the clip 28 and allow the bag 61 itself to fall through the scoop 21 as it disconnects. The user can then retrieve and dispose of the pet waste bag 61 without feeling or handling its trapped contents.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable pet waste scoop, comprising:
   a handle shaft;
   a scoop shaft connected to a lower end of the handle shaft in a telescopic configuration;
   a scoop connected to a lower end of the scoop shaft, the scoop comprising a channel having an open-ended front portion extending in a first direction perpendicular to the scoop shaft and an open-ended rear portion extending in an opposing second direction at an upward angle with respect to the front portion;
   a first annular groove disposed on the front portion of the scoop and a second annular groove disposed on the rear portion of the scoop;
   one or more resilient clips affixed to the scoop, wherein each resilient clip includes a connected portion oriented toward a front end of the scoop and a liftable tab portion oriented toward a rear end of the scoop;
   wherein the one or more resilient clips are configured to removably secure a bag to the scoop in a first configuration, whereby the rear end of the scoop extends into an interior volume of the bag through an open end of the bag when the bag is secured to the scoop, such that a closed end of the bag retains pet waste as it exits the rear end of the scoop.

2. The adjustable pet waste scoop of claim 1, further comprising a handle grip affixed to an upper end of the handle shaft.

3. The adjustable pet waste scoop of claim 1, further comprising a ball detent mechanism configured to secure the scoop at a desired distance from the handle shaft.

4. The adjustable pet waste scoop of claim 1, wherein the handle shaft is straight, and wherein the scoop shaft includes a single bend defining an angle with respect to the handle shaft.

5. The adjustable pet waste scoop of claim 1, further comprising a first clamp removably secured to the first annular groove and a second clamp removably secured to the second annular groove.

6. The adjustable pet waste scoop of claim 5, wherein the first clamp and the second clamp each comprises a pair of jaws connected via a spring mechanism that is configured to bias the pair of jaws towards a closed position.

7. The adjustable pet waste scoop of claim 1, further comprising a connection member affixed to the scoop, wherein the lower end of the scoop shaft is secured within the connection member.

8. An adjustable pet waste scoop, comprising:
- a handle shaft;
- a scoop shaft connected to a lower end of the upper handle shaft in a telescopic configuration,
- a scoop connected to a lower end of the scoop shaft, the scoop comprising a channel having an open ended front portion extending in a first direction perpendicular to the scoop shaft and a rear portion extending upwardly in an opposing second direction at an angle with respect to the front portion;
- the scoop shaft having a single bend defining an angled lower end such that the handle shaft extends rearwardly at an angle when the lower end of the scoop shaft is in a vertical position;
- wherein the rear end of the scoop extends upwardly towards the rearwardly angled handle shaft when the lower end of the scoop shaft is in a vertical position;
- a first annular groove disposed on the front portion of the scoop and a second annular groove disposed on the rear portion of the scoop;
- one or more resilient clips affixed to the scoop, where each resilient clip is oriented such that it includes a connected portion oriented toward a rear end of the scoop and a liftable tab portion oriented toward a front end of the scoop;
- wherein the one or more resilient clips are configured to removably secure a bag to the scoop in a second configuration, whereby a rear end of the bag extends out through the rear end of the scoop when a front opening of the bag is removably secured to the front end of the scoop.

9. The adjustable pet waste scoop of claim 8, further comprising a handle grip affixed to an upper end of the handle shaft.

10. The adjustable pet waste scoop of claim 8, further comprising a ball detent mechanism configured to secure the scoop at a desired distance from the handle shaft.

11. The adjustable pet waste scoop of claim 8, further comprising a first clamp removably secured to the first annular groove and a second clamp removably secured to the second annular groove.

12. The adjustable pet waste scoop of claim 11, wherein the first clamp and the second clamp each comprises a pair of jaws connected via a spring mechanism that is configured to bias the pair of jaws towards a closed position.

13. The adjustable pet waste scoop of claim 8, further comprising a connection member affixed to the scoop, wherein the lower end of the scoop shaft is secured within the connection member.

\* \* \* \* \*